United States Patent [19]

Cooke

[11] Patent Number: 5,371,124
[45] Date of Patent: Dec. 6, 1994

[54] RADIATION-RESISTANCE PROPYLENE POLYMER COMPOSITION AND RADIATION STERILIZED ARTICLES THEREFROM

[75] Inventor: Joel M. Cooke, Chester County, Pa.

[73] Assignee: Himont Incorporated, Wilmington, Del.

[21] Appl. No.: 59,721

[22] Filed: May 10, 1993

Related U.S. Application Data

[63] Continuation of Ser. No. 523,633, May 15, 1990, abandoned.

[51] Int. Cl.$^5$ .................................................. C08K 5/34
[52] U.S. Cl. ...................................... 524/99; 524/100; 524/102; 524/274
[58] Field of Search ............... 524/99, 100, 102, 274; 522/75, 79

[56] References Cited

U.S. PATENT DOCUMENTS

| | | | |
|---|---|---|---|
| 3,313,754 | 4/1967 | Logan | 524/274 |
| 3,463,752 | 8/1969 | Bornstein | 524/274 |
| 3,598,776 | 8/1971 | Schirmer | 524/274 |
| 4,110,185 | 8/1979 | Williams et al. | 204/159 |
| 4,274,932 | 6/1981 | Williams et al. | 204/159.2 |
| 4,279,659 | 7/1981 | Unmuth | 524/274 |
| 4,563,259 | 1/1986 | Rayner | 524/99 |
| 4,710,524 | 12/1987 | Donohue | 522/75 |
| 4,749,734 | 6/1988 | Williams et al. | 524/102 |
| 4,797,438 | 1/1989 | Kletecka et al. | 524/100 |
| 4,888,369 | 12/1989 | Moore, Jr. | 524/100 |
| 4,888,371 | 12/1989 | Tajima et al. | 524/120 |
| 5,041,483 | 8/1991 | Burch | 524/274 |

FOREIGN PATENT DOCUMENTS

| | | |
|---|---|---|
| 0198173 | 10/1986 | European Pat. Off. . |
| 0234986 | 9/1987 | European Pat. Off. . |

Primary Examiner—John Kight, III
Assistant Examiner—R. F. Johnson

[57] ABSTRACT

Disclosed is a radiation resistant propylene polymer composition comprising a propylene polymer material and generally from about 0.1 to about 5 pph, of the propylene polymer material, of a rosin material. A hindered amine is present when the concentration of the rosin material is low, i.e., below 1.0 pph. At higher concentrations of rosin material, the hindered amine is optional. Radiation sterilized articles in which at least part of the material construction thereof comprises said radiation resistant propylene polymer composition are also disclosed.

11 Claims, No Drawings

RADIATION-RESISTANCE PROPYLENE POLYMER COMPOSITION AND RADIATION STERILIZED ARTICLES THEREFROM

This application is a continuation of application Ser. No. 07/523,633, filed May 15, 1990, now abandoned.

FIELD OF THE INVENTION

The present invention relates to a high energy radiation resistant propylene polymer composition and to radiation sterilized articles in which at least a part of the material of construction comprises the propylene polymer composition.

BACKGROUND OF THE INVENTION

Various additives have been proposed for inhibiting the discoloration, degradation, and/or embrittlement which occur in polymers, such as polypropylene, on exposure to irradiation. Suppression of these deleterious changes in the polymers is necessary to render them suitable for use in articles which are to be sterilized by irradiation, a sterilizing technique commonly practiced on medical articles.

U.S. Pat. No. 4,110,185 describes incorporating a low molecular weight, preferably not highly viscous, liquid mobilizer, such as a hydrocarbon oil, into a semi-crystalline polypropylene to increase the free volume of the polymer and allow it to retain its flexibility after irradiation. U.S. Pat. No. 4,274,932 describes incorporating the mobilizer in a semi-crystalline polypropylene which has been visbroken to give it a narrow molecular weight distribution.

According to U.S. Pat. No. 4,749,734, a mobilizing additive, such as a hydrocarbon oil, and a heterocyclic hindered amine are used in combination to stabilize semi-crystalline polypropylene against radiation. A thioester should not be present.

U.S. Pat. No. 4,710,524 notes that the inclusion of a mobilizing additive as described in U.S. Pat. Nos. 4,110,185 and 4,274,932 produces some undesirable side effects including handling and imprinting problems. U.S. Pat. No. 4,710,524 discloses stabilizing polyolefins against the effects of radiation by incorporating therein a hindered piperidine compound and a light-stabilizing additive, such as a benzophenone precursor.

U.S. Pat. No. 4,563,259 describes the addition of from 0.01 to 2.0%, by weight of the polymer, of the polymer of a hindered amine or its salt, N-oxide, N-hydroxide or N-nitroxide to a substantially crystalline polymer of an aliphatic $C_{2-6}$ monoolefin.

U.S. Pat. No. 4,797,438 describes using hindered amines containing a polysubstituted piperazin-2-one moiety without an antioxident to achieve improved strength and discoloration resistance in irradiated propylene polymers.

U.S. Pat. No. 4,888,369 discloses inhibiting the radiation-induced degradation of polypropylene by dispersing therein, prior to irradiation, a synergistic mixture of a hindered amine component, a hindered phenolic component, and a phosphorus-containing component. The polypropylene has a narrow molecular weight distribution, achieved by treating ("visbreaking") polypropylene having its as-prepared molecular weight distribution.

SUMMARY OF THE INVENTION

This invention provides a radiation resistant propylene polymer composition useful in the manufacture of a radiation sterilizable article which comprises (1) a propylene polymer material, (2) from about 0.1 to about 5 parts per hundred (pph), of the propylene polymer material, of a rosin material, and (3) a hindered amine, e.g., in the amount of from about 0.01 to about 3.0 pph of the propylene polymer material when the amount of rosin material is less than 1.0 pph and optionally, when the amount of rosin material is 1.0 pph and above.

The present invention also provides a radiation sterilizable article in which at least part of the material construction thereof comprises a composition of this invention.

In another embodiment, this invention provides a radiation sterilized article made by converting the radiation resistant compositions of this invention into useful articles and then subjecting the articles to high energy radiation to sterilize the articles and the material contained therein. A radiation dosage of 2.5 megarads is sufficient to effectively sterilize shaped articles and the material contained therein and is the industry standard. However, radiation dosages up to about 5.0 megarads can be applied even though dosages in excess of 2.5 megarads are not necessary to accomplish the sterilization.

Typical useful articles include syringes bodies, tubing and tube assemblies, forceps, surgical clamps, packaging film, tissue culture tubes, fibers for surgical gowns, sheets and the like.

The articles to be radiation sterilized may be produced by conventional methods of manufacturing such articles, such as molding, including injection molding, compression molding, extrusion molding, or vacuum molding; extrusion; extrusion casting; spun-bonding; melt blowing; etc.

Unless otherwise specified, all quantities of ingredients are in pph of the propylene polymer material except, of course, for the propylene polymer material.

DETAILED DESCRIPTION

In the radiation resistant propylene polymer composition of this invention, the rosin material may be an unmodified rosin, but preferably is a rosin which has been modified by hydrogenation. As used herein, the term "hydrogenated rosin" denotes any rosin material in which the ethylenic unsaturation of the resin acids thereof are partially or substantially completely hydrogenated. Typically a partially hydrogenated rosin is hydrogenated to the extent that 40 to 60% of its total ethylenic unsaturation has been saturated. A substantially completely hydrogenated rosin material usually has greater than 60% up to about 95%, preferably about 65% to about 95%, most preferably about 65% to 90% of its total ethylenic unsaturation saturated with hydrogen. Substantially completely hydrogenated rosin materials are generally referred to by the manufacturers of same as highly hydrogenated rosin materials.

The rosin material in the radiation resistant compositions of this invention may be one in which the resin acid carboxyl groups have undergone essentially no modification, i.e., the rosin material, having free acid carboxyl groups, is an acidic resin. Examples of such rosin materials are wood rosin, gum rosin, tall oil rosin, and partially or substantially completely hydrogenated rosin, (e.g. Staybelite rosin and Foral AX rosin, respectively), Other rosin materials include rosin esters, partially or substantially completely hydrogenated rosin esters and partially or substantially completely hydrogenated rosin esters which have been hydrogenated to convert the ester groups into primary alcohol groups. Such rosin materials are commercially available.

Rosin esters can be prepared by esterifying rosin or a partially or substantially completely hydrogenated rosin with a monohydric alcohol, such as methanol, or with a polyhydric alcohol, such as glycerol, triethylene glycol, or pentaerythritol. Partially or substantially completely hydrogenated rosin esters are preferred, especially the hydrogenated methyl ester of rosin, such as Hercolyn D methyl ester of rosin.

A partially or substantially completely hydrogenated rosin material in which the ester groups have been hydrogenated to covert them into primary alcohol (—$CH_2OH$) groups is the most preferred rosin material for the composition of the invention and for the radiation sterilizable and sterilized articles made therefrom. Especially preferred is hydroabietyl alcohol material which is a rosin material which consist substantially of hydroabietyl alcohol, i.e., having a hydroabietyl alcohol content of at least 70%, preferably at least 80%. Ester groups may be converted into primary alcohol groups by the hydrogenation of the methyl ester of rosin at 300° C. and 34.5 kPa in the presence of a copper chromite catalyst. A commercially available alcohol is Abitol technical hydroabietyl alcohol which is a high molecular weight primary alcohol having a typical hydroabietyl alcohol content of 83% and a degree of unsaturation expressed as 0.71 gram of hydrogen absorbed per 100 grams of Abitol technical hydroabietyl alcohol.

A discussion of the nature and chemistry of rosin and rosin derivatives, including techniques for hydrogenating and esterifying rosin, may be found in the Encyclopedia of Chemical Technology, 2nd Edition, 1968, Vol. 17, pages 476–507, the contents of which are incorporated herein by reference.

The term "rosin material" is meant to include, in addition to the above described rosin materials, the individual resin acids components of the rosin. These acids include abietic acid, neoabietic acid, dihydroabietic acid, tetrahydroabietic acid, dehydroabietic acid, pimaric acid, isopimaric acid, dihydrodextropimaric acid, tetrahydrodextropimaric acid, dihydroisodextropimaric acid, and tetrahydroisodextropimaric acid. In a similar manner, the esters and alcohol derivatives of the individual resin acids may be used as isolated entities. Techniques for isolating resin acids are described in the aforementioned Encyclopedia of Chemical Technology reference, page 484. The rosin material may be a rosin, modified rosin or rosin esters, as previously defined, or a resin acid or derivative thereof, or any combination or mixture of such rosin materials.

The rosin material is particularly effective when used in the composition of this invention together with a hindered amine light stabilizer, e.g., one or more of the hindered heterocyclic amine light stabilizers known to the art and commonly referred to as HALS. Such additives are described, for example, in the previously mentioned U.S. Pat. Nos. 4,710,524, 4,749,734, 4,797,438, and 4,888,369, the disclosures of which with respect to the HALS materials are incorporated herein by reference. In compositions in which the concentration of the rosin material is less than about 1.0 pph, about 0.01 to 3.0 pph of a HALS compound also is present, preferably 0.05 to 2.0 pph and most preferably 0.1 to 0.2 pph.

More than 3.0 pph of a HALS compound is generally not needed although greater than 3.0 pph of HALS is within the broadest aspects of the invention. With rosin material concentrations in the compositions of this invention of about 1 pph and above, the presence of the HALS is optional, but often preferred.

Accordingly, the content of the rosin material in the radiation resistent composition will be 0.1 pph to less than 1 pph, provided that a hindered amine is present, and otherwise at least 1 pph. The amount of rosin material required to achieve a given radiation resistance level may vary depending on the particular rosin material used. Usually there will be no need to use more than about 5 pph rosin material although concentrations above about 5 pph are within the broadest aspects of the invention. Preferably the rosin materials are present in concentrations of from 0.1 to about 2 pph, and a hindered amine preferably is present.

Of the hindered amines which can be employed in the composition, bis(hindered piperidine) compounds are preferred, and, of these, hindered bis(4-piperidinyl) diesters of dicarboxylic acids are especially preferred. Examples of the latter are bis(2,2,6,6-tetramethyl-4-piperidyl) sebacate, bis(1,2,2,6,6-pentamethyl-4-piperidyl)-2-n-butyl-2-(3,5-di-tert-butyl-4- hydroxybenzyl) malonate, and bis(1,2,2,6,6-pentamethyl-4-piperidyl) sebacate. Mixtures of such amines may be used.

The propylene polymer material in this invention is a crystalline or semi-crystalline propylene polymer material having a crystallinity as determined by X-ray diffraction of from 20 to about 90%. The propylene polymer material may be a narrow molecular weight polymer, i.e. those polymer materials generally having a molecular weight distribution of 2 to less than 4, preferably 2.5 to less than 4, or a medium to high molecular weight polymer, i.e. those polymer materials generally having a molecular weight distribution of 4 to about 7, preferably 4 to about 5.5.

The propylene polymer material in the present composition is (a) a homopolymer of propylene; (b) a random copolymer of propylene and an olefin selected from the group consisting of ethylene, and $C_4$-$C_{10}$ 1-olefins, provided that, when the olefin is ethylene, the maximum polymerized ethylene content is about 10 (preferably about 4) percent by weight, and, when the olefin is a $C_4$-$C_{10}$ 1-olefin, the maximum polymerized content thereof is about 20 (preferably about 16) percent by weight; (c) a random terpolymer of propylene and an olefin selected from the group consisting of ethylene and $C_4$-$C_8$ 1-olefins, provided that the maximum polymerized $C_4$-$C_8$ 1-olefin content is about 20 (preferably about 16) percent by weight, and, when ethylene is one of the olefins, the maximum polymerized ethylene content is about 5 (preferably about 4) percent by weight; or (d) a homopolymer of (a) or random copolymer of (b) which is impact-modified with an ethylene-propylene rubber in a reactor or series of reactors in the presence of (a) or (b) as well as by physical blending (a) or (b) with the rubber until a homogeneous blend is obtained. The ethylene-propylene rubber content of (d) being from about 5 to about 60% and the ethylene content of said rubber being from about 7 to about 70%, preferably from about 10 to about 40%.

The $C_4$-$C_{10}$ 1-olefins include the linear and branched $C_4$-$C_{10}$ 1-olefins such as, for example, 1-butene, 1-pentene, 3-methyl-1-butene, 4-methyl-1-pentene, 1-hexene, 3,4-dimethyl-1-butene, 1-heptene, 3-methyl-1-hexene, and the like.

Propylene homopolymers and random copolymers are preferred propylene polymer materials.

Small amounts of additives such as antioxidants and/or light stabilizers may be present in the rosin-containing propylene polymer composition. These include phenolic antioxidants of the kind used in polyolefins, e.g., tetrakis[methylene 3-(3′,5′-di-tert-butyl-4′-hydroxyphenyl) propionate] methane, and heat- and light-stabilizing phosphites, e.g., tris-(2,4-di-tert-butylphenyl) phosphite. Other additives such as fillers, colorants, nucleating agents, and mobilizers also can be present.

The following examples, presented for illustrative purposes, describe preferred embodiments of the radiation resistant propylene polymer composition and radiation sterilized article of the invention.

EXAMPLES 1–25

The composition of the invention was prepared in different formulations by blending a rosin material with Profax 6801 propylene homopolymer in flake form and having a nominal melt flow rate, as-produced, of 0.3 dg/min (ASTM Method D1238-82, Condition L). In some of the formulations the polypropylene used had a MFR of 12–14 dg/min as a result of having visbroken a crystalline normally solid polypropylene that had an as-formed molecular weight distribution and a nominal melt flow rate of 0.3 by treatment with an organic peroxide; namely, Lupersol 101 2,5-dimethyl-2,5-bis-t-butylperoxyhexane. All of the formulations contained 0.1 pph of calcium stearate, and, except as noted, 0.05 to 0.2 pph of a HALS, i.e., bis(2,2,6,6-tetramethyl-4-piperidyl) sebacate. The ingredients, which were in finely divided condition, were mixed together and melt compounded, and the resulting blends were extruded into 40 mil sheets.

The rosin material used in Examples 1–11 was Abitol technical hydroabietyl alcohol, in Examples 12–19, Hercolyn D substantially completely hydrogenated methyl ester of rosin, and in Examples 20–25, Foral AX substantially completely hydrogenated wood rosin, all of which rosin materials are commercially available.

The sheets prepared from the formulations were exposed to cobalt 60 gamma radiation at two different dose levels, i.e., 3 Mrad and 5 Mrad. The irradiated sheets were aged at 60° C. and tested for impact strength (Gardner) at selected intervals after irradiation over periods of up to 53 weeks. The same formulations in the unirradiated condition were evaluated according to the same schedule, as were control compositions, which did not contain a rosin material. An impact strength of 2.0 in-lb or less was considered a failure. The typical impact strength of unirradiated samples was 30–35 in-lb.

Tables I, II and III show the ingredients and typical data obtained for the formulations of Examples 1–11, 12–19, and 20–25, respectively. The ingredients and typical data for the control compositions are given in Table I. The numbers in the example number columns indicating the amounts of the ingredients in each example are in pph of the propylene polymer material.

TABLE I

| Example No. | Control Expt. | Rosin Material | HALS | Dose (Mrad) | DTF |
|---|---|---|---|---|---|
| 1a | | 4 | — | 0 | >319 |
| 1b | | 4 | — | 3 | >319 |
| 1c | | 4 | — | 5 | >319 |
| 2a | | 1 | — | 0 | >319 |
| 2b | | 1 | — | 3 | >319 |

TABLE I-continued

| Example No. | Control Expt. | Rosin Material | HALS | Dose (Mrad) | DTF |
|---|---|---|---|---|---|
| 2c | | 1 | — | 5 | 43 |
| 3a* | | 1 | — | 0 | >250 |
| 3b* | | 1 | — | 3 | >250 |
| 3c* | | 1 | — | 5 | 38 |
| | 1a | — | — | 0 | >319 |
| | 1b | — | — | 3 | 0 |
| | 1c | — | — | 5 | 0 |
| | 2a* | — | — | 0 | >334 |
| | 2b* | — | — | 3 | 0 |
| | 2c* | — | — | 5 | 0 |
| 4a | | 4 | 0.12 | 0 | >371 |
| 4b | | 4 | 0.12 | 3 | >371 |
| 4c | | 4 | 0.12 | 5 | >371 |
| 5a | | 2 | 0.12 | 0 | >371 |
| 5b | | 2 | 0.12 | 3 | >371 |
| 5c | | 2 | 0.12 | 5 | >371 |
| 6a | | 1 | 0.12 | 0 | >371 |
| 6b | | 1 | 0.12 | 3 | >371 |
| 6c | | 1 | 0.12 | 5 | >371 |
| 7a* | | 1 | 0.12 | 0 | >250 |
| 7b* | | 1 | 0.12 | 3 | >250 |
| 7c* | | 1 | 0.12 | 5 | >250 |
| 8a | | 0.5 | 0.12 | 0 | >370 |
| 8b | | 0.5 | 0.12 | 3 | >370 |
| 8c | | 0.5 | 0.12 | 5 | >370 |
| 9a | | 0.5 | 0.05 | 0 | >112 |
| 9b | | 0.5 | 0.05 | 3 | >112 |
| 9c | | 0.5 | 0.05 | 5 | >112 |
| 10a | | 0.5 | 0.2 | 0 | >112 |
| 10b | | 0.5 | 0.2 | 3 | >112 |
| 10c | | 0.5 | 0.2 | 5 | >112 |
| 11a | | 0.1 | 0.12 | 0 | >370 |
| 11b | | 0.1 | 0.12 | 3 | >370 |
| 11c | | 0.1 | 0.12 | 5 | >370 |
| | 3a | — | 0.12 | 0 | >370 |
| | 3b | — | 0.12 | 3 | >370 |
| | 3c | — | 0.12 | 5 | 11 |
| | 4a* | — | 0.12 | 0 | >250 |
| | 4b* | — | 0.12 | 3 | >250 |
| | 4c* | — | 0.12 | 5 | 33 |

*Polypropylene visbroken to MFR 12–14 dg/min

TABLE II

| Example No. | Rosin Material | HALS | Dose (Mrad) | DTF |
|---|---|---|---|---|
| 12a | 4 | — | 0 | >319 |
| 12b | 4 | — | 3 | >319 |
| 12c | 4 | — | 5 | 71 |
| 13a | 1 | — | 0 | >319 |
| 13b | 1 | — | 3 | >319 |
| 13c | 1 | — | 5 | 0 |
| 14a* | 1 | — | 0 | >250 |
| 14b* | 1 | — | 3 | >250 |
| 14c* | 1 | — | 5 | 38 |
| 15a | 4 | 0.12 | 0 | >371 |
| 15b | 4 | 0.12 | 3 | >371 |
| 15c | 4 | 0.12 | 5 | >371 |
| 16a | 2 | 0.12 | 0 | >371 |
| 16b | 2 | 0.12 | 3 | >371 |
| 16c | 2 | 0.12 | 5 | >371 |
| 17a | 1 | 0.12 | 0 | >371 |
| 17b | 1 | 0.12 | 3 | >371 |
| 17c | 1 | 0.12 | 5 | >371 |
| 18a* | 1 | 0.12 | 0 | >250 |
| 18b* | 1 | 0.12 | 3 | >250 |
| 18c* | 1 | 0.12 | 5 | >250 |
| 19a | 0.5 | 0.12 | 0 | >250 |
| 19b | 0.5 | 0.12 | 3 | >250 |
| 19c | 0.5 | 0.12 | 5 | >250 |

*Polypropylene visbroken to MFR 12–14 dg/min

TABLE III

| Example No. | Rosin Material | HALS | Dose (Mrad) | DTF |
|---|---|---|---|---|
| 20a | 4 | 0.12 | 0 | >371 |

TABLE III-continued

| Example No. | Rosin Material | HALS | Dose (Mrad) | DTF |
|---|---|---|---|---|
| 20b | 4 | 0.12 | 3 | >371 |
| 20c | 4 | 0.12 | 5 | 11 |
| 21a | 2 | 0.12 | 0 | >371 |
| 21b | 2 | 0.12 | 3 | >371 |
| 21c | 2 | 0.12 | 5 | 35 |
| 22a | 1 | 0.12 | 0 | >371 |
| 22b | 1 | 0.12 | 3 | >371 |
| 22c | 1 | 0.12 | 5 | 64 |
| 23a* | 1 | 0.12 | 0 | >250 |
| 23b* | 1 | 0.12 | 3 | >250 |
| 23c* | 1 | 0.12 | 5 | 125 |
| 24a | 0.5 | 0.12 | 0 | >250 |
| 24b | 0.5 | 0.12 | 3 | >250 |
| 24c | 0.5 | 0.12 | 5 | 167 |
| 25a | 0.5 | — | 0 | >113 |
| 25b | 0.5 | — | 3 | >113 |
| 25c | 0.5 | — | 5 | 13 |

EXAMPLE 26

The procedure and ingredients of Examples 8a–8c were repeated with the exception that 0.1 pph of tetrakis [methylene 3-(3',5'-di-tert-butyl-4'-hydroxyphenyl) propionate] methane was substituted for the 0.12 pph of bis(2,2,6,6-tetramethyl-4-piperidyl) sebacate. The number of days to failure of samples which had been irradiated with 3 Mrad and 5 Mrad doses, as well as an unirradiated sample, exceeded 113. A sample made from the same composition but from which the rosin material was omitted failed in 8 days after irradiation with a 5 Mrad dose.

EXAMPLE 27

The procedure and ingredients of Examples 8a–8c were used except that commercially available Pexite WG wood rosin was substituted for Abitol hydroabietyl alcohol and the amount of hindered amine used was 0.1 pph. The number of days to failure of a sample which had been irradiated with a 3 Mrad dose, as well as an unirradiated sample, exceeded 113.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A radiation resistant composition comprising a crystalline or semi-crystalline propylene polymer material, from about 1.0 to 5 pph, of the propylene polymer material, of a rosin material consisting substantially of hydroabietyl alcohol and from about 0.01 to about 3.0 pph, of the propylene polymer material, of a hindered amine light stabilizer.

2. A radiation resistant composition comprising (1) a crystalline or semi-crystalline propylene polymer material, (2) from 0.1 to 5 pph, of the propylene polymer material, of a partially or substantially completely hydrogenated rosin esters in which the ester groups have been replaced by primary alcohol groups, and (3) 0.12 to 0.2 pph, of the propylene polymer material, of a hindered amine light stabilizer.

3. The composition of claim 2 wherein said rosin material is a substantially completely hydrogenated rosin ester in which the ester groups have been replaced by primary alcohol groups.

4. The composition of claim 3 wherein said rosin material consist substantially of hydroabietyl alcohol.

5. The composition of claim 2 wherein said rosin material is present in an amount from about 0.1 to about 2 pph of the propylene polymer material.

6. A radiation sterilized article in which at least part of the material construction thereof comprises a propylene polymer composition of claim 1.

7. A radiation sterilized article in which at least part of the material construction thereof comprises a propylene polymer composition of claim 2.

8. A radiation sterilized article in which at least part of the material construction thereof comprises a propylene polymer composition of claim 2.

9. A radiation sterilized article in which at least part of the material construction thereof comprises a propylene polymer composition of claim 4.

10. A radiation sterilizable article in which at least a part of the material of construction thereof comprises the composition of claim 1.

11. A radiation sterilizable article in which at least a part of the material of construction thereof comprises the composition of claim 2.

* * * * *